United States Patent [19]

D'Archambaud

[11] Patent Number: 5,127,426
[45] Date of Patent: Jul. 7, 1992

[54] VALVE

[76] Inventor: Charles P. D'Archambaud, 269 Stockport Road, Guide Bridge, Ashton-under-Lyne, OL7 Ont, United Kingdom

[21] Appl. No.: 598,727
[22] PCT Filed: Apr. 12, 1989
[86] PCT No.: PCT/GB89/00390
 § 371 Date: Dec. 12, 1990
 § 102(e) Date: Dec. 12, 1990
[87] PCT Pub. No.: WO89/09903
 PCT Pub. Date: Oct. 19, 1989

[30] Foreign Application Priority Data

Apr. 15, 1988 [GB] United Kingdom ............... 8808986

[51] Int. Cl.⁵ .............................................. F16K 11/07
[52] U.S. Cl. ...................................... 137/113; 137/557
[58] Field of Search ......................... 137/113, 114, 557

[56] References Cited

U.S. PATENT DOCUMENTS

| 1,998,020 | 4/1935 | Mezger | 137/114 |
| 2,641,273 | 6/1953 | Siebens . | |
| 3,008,481 | 11/1961 | Matheson et al. . | |
| 3,224,455 | 12/1965 | Alfieri | 137/113 |
| 3,583,421 | 6/1971 | Treloar | 137/113 |
| 3,890,995 | 6/1975 | Miller et al. | 137/113 |
| 3,920,033 | 11/1985 | Ferrando . | |
| 4,018,244 | 4/1977 | Burns | 137/113 |
| 4,281,677 | 8/1981 | Hoffman | 137/113 |
| 4,306,586 | 12/1983 | Spencer . | |
| 4,467,825 | 8/1984 | Boyd . | |
| 4,719,937 | 1/1988 | Roch et al. | 137/114 |

FOREIGN PATENT DOCUMENTS

| 1182968 | 12/1964 | Fed. Rep. of Germany . |
| 3529487 | 1/1987 | Fed. Rep. of Germany . |
| 8816198 | 6/1989 | Fed. Rep. of Germany . |
| 792201 | 3/1958 | United Kingdom . |

Primary Examiner—Stephen M. Hepperle
Attorney, Agent, or Firm—Spensley Horn Jubas & Lubitz

[57] ABSTRACT

A valve of the kind for controlling the flow of fluid from at least two alternative supplies in such a manner that reduction or cessation of one supply automatically causes the valve to switch to another of the alternative supplies comprises a cylinder having a piston slidable therein in a region between a first fluid inlet and a second fluid inlet. The piston has working surfaces of differential area such that equal pressure on both sides of the piston biases the piston to one end of the cylinder. The valve has a fluid outlet with a first fluid flow path from the first fluid inlet to the fluid outlet, and a second fluid flow path from the second fluid inlet to the fluid outlet and including an axial outlet bore. The second fluid flow path is closable by the piston and is opened up on axial movement of the piston towards the first fluid inlet which is caused when the supply of fluid from the first fluid inlet fails, is arrested or falls below a predetermined limit. The first fluid flow path of the valve is permanently open thus rendering the valve fail safe. The axial outlet bore of the second fluid flow path is formed through the piston and is closable by a seal in the cylinder against which an end of the piston is adapted to abut thus ensuring a compact valve construction.

23 Claims, 2 Drawing Sheets

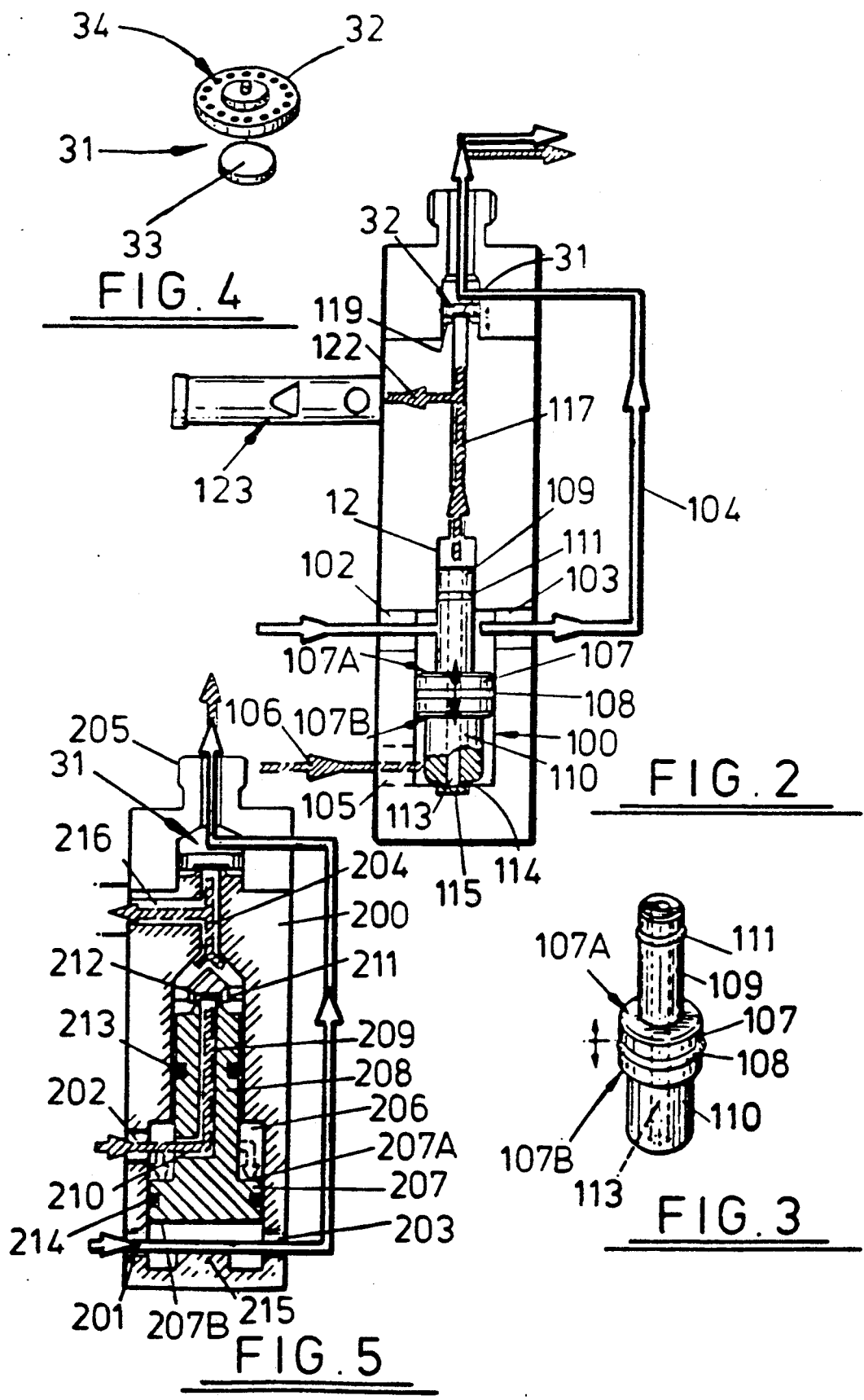

VALVE

This invention relates to a valve and more particularly but not exclusively to a valve for controlling the flow of fluid nair or other gas, or liquid) from at least two alterantive supplies in such manner that reduction or cessation of one supply automatically causes the valve to switch to another of the alternative supplies.

Such a valve is hereinafter and in the claims referred to, where required, as "a valve of the kind described".

DE-A-3529487 discloses a valve of the kind described for use with breathing equipment and comprising a first air inlet connectible to a primary air supply and which communicates with an air outlet via a one-and valve, a second air inlet connected to a secondary (reserve) air supply and which is connectible to the air outlet, by-passing the one-way valve, and, between the air inlets abnd the air outlet, first and second spaced parallel bores, whereof the second bore communicates directly with the fluid outlet and is in communication with the first bore via a connecting passage. The first bore accommodates an axially-movable double piston having opposed ends of differential area.

With the primary air supply in use, the double piston is axialy moved to close the connecting passage and so communiation between the first and second bores and the air outlet, the one-way valve is opened, and air is supplied from the primary air supply to the air outlet.

With the secondary air supply in use (the primary air supply having failed, been arrested, or having fallen below a predetermined limit), the double piston is axially moved to plug into and close the primary air inlet, thus causing closure of the one-way valve, and to open the connecting passage between the first and second bore so that air from the secondary air supply is delivered directly to the air outlet the first bore, the connecting passage and the second bore.

DE-A-3529487 discloses the use of an air pressure controlled, spring-loaded indicating pin in communication with the primary air pressure supply such that, when the latter is in use, the pin is in an upper position but, when the secondary air supply is in use, the indicating pin is in a lower position. Thus an indication is given in a visible or tactile manner as to which air supply is operational.

DE-A-3529487 also disclsoes the use of an acoustic signalling device operated by the secondary (reserve) air supply to indicate that it is the secondary (resserve) air supply which is in use.

The valve disclosed in DE-A-3429487 has the disadvantage that the double piston plugs into the primary air inlet to close same when the secondary (reserve) air supply is in use. A danger therefore exists that if, upon exhaustion of the secondary (reserve) air supply, the double piston fails to move axially to open the primary air inlet, for example it jams due to ingress of dirt or other foreign matter, the life of the user will be at risk.

It is an object of the present invention to provide such a valve which avoids this danger, and which additionally provides such a valve of simpler and more compact construction compared with that in DE-A-3529487 and which is, in consequence, more economic to manufacture.

According to the present invention there if provided a valve of the kind described comprising a cylinder having a piston slidable therein in a region between a first fluid inlet and a second fluid inlet, the piston having working surfaces of differential area such that equal pressure on both sides of the piston biases the piston to one end of the cylinder, a fluid outlet from the valve, a first fluid flow path from the first fluid inlet to the fluid outlet, a second fluid flow path from the second fluid inlet to the fluid outlet and including an axial outlet bore, the second fluid flow path being closable by the piston and being opened upon axial movement of the piston towards the first fluid inlet caused when the supply of fluid from the first fluid inlet fails, is arrested or falls below a predetermined limit, the valve being characterised in that the first fluid flow path is permanently open thus rendering the valvel fail safe, and in that the axial outlet bore of the second fluid flow path is formed through the piston and is closable by a seal in the cylinder against which an end of the piston is adapted to abut.

The valve of the kind described according to the present invention has many applications including, inter alia:

1. the provision of a secondary air supply to air breathing apparatus used by an operative working in a contaminated atmosphere, which apapratus is normally connected to a primary air supply, in case of failure of the latter.
2. the operation (standby or primary) of bulk fire extinguishers, such as halon extinguishers on ships, or other $CO2$ or other inert gas media for fire-fighting purposes.
3. in hydraulic applications, to cut in a secondary supply or to operate as a sensing valve.
4. in air brake systems, to operate as a fail safe device if a mains supply fails, which systems may be used in any vehicle or machine requiring air braking or emergency braking systems.
5. as a control valve for use in operating a secondary function.
6. in the underwater diving industry to operate emergency gas supplies to divers.
7. in high pressure reduction systems.
8. in anti-skid braking systems.

Embodiments of th einvention will now be described, by way of example, with reference to the accompanying drawing, in which:

FIG. 2 is a diagram of a modified valve of the kind described;

FIG. 3 is a perspective view of the piston of the valve of FIG. 2;

FIG. 4 is an exploded perspective view of a seal and outlet assembly of the second fluid flow path of the valve of both FIGS. 1 and 2; and FIG. 5 is a sectional view of an alternative embodiment of valve of the kind described for use in an air supply system.

Figure 1:
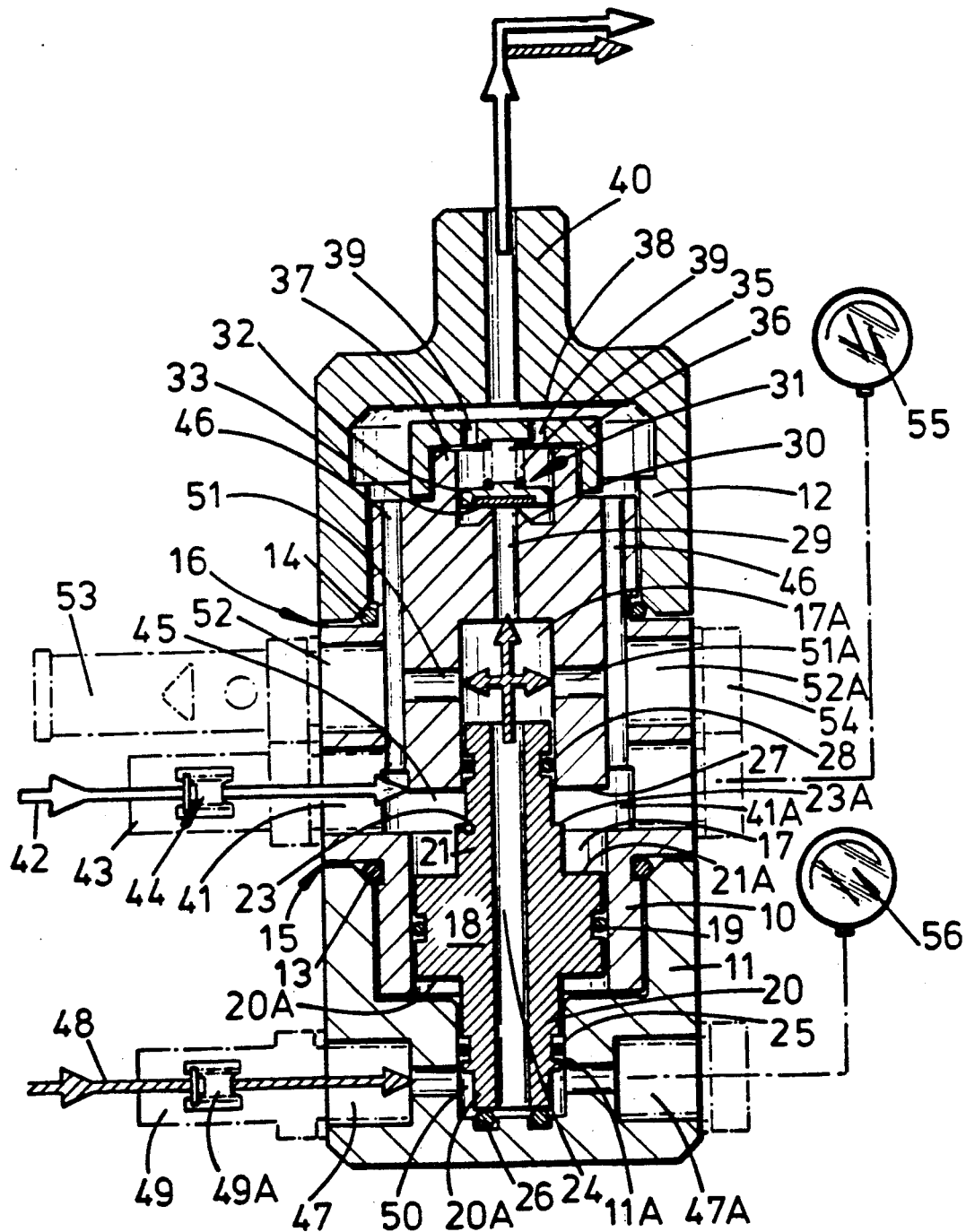
FIG. 1 is a longitudianl sectional view of a valve of the kind described in an air supply system.

It is known for operatives in contaminated atmospheres to be provided with breathing apparatus which in normal use is connected to mains air supply. To guard against failure of this primary air the operative also carries a reservoir of compressed nsecondary) air. If the primary air fails the operative must be connected to the secondary air without perceptible delay and with an indication that the primary air has failed.

Referring to FIG. 1 of the drawings, the valve of the kind described comprises, in screw-engaging relationship, a main body 10 and two end caps 11 and 12.

O-ring seals 13 and 14 are provided between the main body 10 and the end cap 11 and the main body 10 and the end cap 12 respectively at the junction lines 15 and 16 respectively thereof.

The main body 10 constitutes a cylinder within the chamber 17 of which is accommodated an axially-movable piston 18, an O-ring seal 19 being fitted between the piston 18 and the wall of the cylinder 10.

The piston 18 is formed with two oppositely-directed axially extensions 20 and 21, the axial extension 21 being stepped radially inwardly as indicated at 23. The axial extension 21 and its step 23 provide an annular working surface 21A, 23A on the piston 18 (hereinafter for convenience called "the upper surface") greater than the annular working surface 20a thereof (hereinafter for convenience called "the lower surface") provided on the piston 18 by the axial extension 20. It will, therefore, be manifest that the application of equal air pressure to both sides of the piston 18 will axially move the piston 18 downwards.

An axial open-ended bore 24 extends through the piston 18 and its oppositely-directed axial extensions 20 and 21.

The axial extension 20 extends into a blind bore 11A of the end cap 11, an O-ring seal 25 being fitted between the axial extension 20 and the wall of the blind bore 11A. The axial extension 20 is of reduced cross-sectional area at its terminal portion 20a and its end is adapted to abut against an O-ring seal 26 in the closed end of the blind bore 11a thereby to close the axial bore 24 at said end.

The axial extension 21 extends into a portion 17A of the chamber 17 which is of reduced diameter defined by a radially-inward stepping 27 of the main body 10. An O-ring seal 28 is fitted between the axial extension 21 and the wall of the chamber portion 17A.

The O-ring seals 19, 25 and 28 are fitted in annular grooves in the piston 18 and axial extensions 20 and 21 respectively.

The chamber portion 17A communicates with a passage 29 of reduced diameter which terminates in a valve seat 30.

A non-return valve 31 engages with the valve seat 30 and comprises (see also FIG. 4) a disc-like body 32 having an inset sealing element 33 on its side adjacent the valve seat 30. The disc-like body 32 is formed with a ring of holes 34 around and radially outwards of the sealing element 33.

The non-return valve 31 is urged against the valve seat 30 by a spring 35 which abuts a cap 36 screw-engaging an end sleeve 37 of the body 10. The cap 36 is open to an air outlet chamber 38 of the valve holes 39 in the cap 36, a ring of equi-angularly spaced holes 39 for example.

The air outlet chamber 38 communicates with an axially-bored fluid outlet spigot 40 of the valve onto which can be engaged, by screwing for exampe, a coupling of an air hose (not shown) connected to a breathing mask (also not shown).

The main body 10 of the valve is formed with a primary or main air inlet 41, air being delivered a hose 42 and a coupling 43 screw-engaging, or otherwise engaging, the air inlet 41. The coupling 43 incorporates a one way valve 44.

The primary air inlet 41 delivers air to a primary air inlet chamber 45 at the upper surface of the piston 18, and this primary air inlet chamber 45 communicates with the air outlet chamber 38 a plurality of bores 46 parallel with the cylinder chamber 17, 17A. These bores 46, four equiangularly spaced bores for example, surround the cylinder chamber 17A.

The end cap 11 is formed with a secondary or reserve air inlet 47, air being delivered from an air cylinder (not shown) for example a hose 48 and a coupling 49 screw-engaging, or otherwise engaging, the air inlet 47. The coupling 49 may include a one-way valve 49A as shown. The latter delivers air to a secondary air inlet chamber 50 at the terminal portion 20A of the axial extension 20.

A radial passage 51 serves to communicate the cylinder chamber portion 17A with an air outlet 52 to which is connected, by screw-engagement for example, an acoustic signalling device, such, for example, as an air whistle 53.

There may be more than one radial passage 51 such as 51A for example with more than one outlet such as 52A for example shown plugged as indicated at 54 in this embodimehnt. These outlets 52, 52A may be used for supplying air for any desired purpose or function.

It will be manifest that the radial passages 51, 51A are disposed between the axial bores 46.

The primary air supply chamber 45 may have more than one port other than primary air inlet 41 communicating therewith for the supply of air into or out of the chamber 45. In the embodiment shown a second port 41A has connected thereto an air pressure gauge 55. These other ports may be used to supply air out of the valve for any desired purpose or function.

Similarly the secondary air supply chamber 50 may have additional ports, such for example, as 47A in communication therewith. Port 47A serves to supply air to an air pressure gauge 56. However, here again these other ports may be used to supply air out of the valve for any desired purpose or function.

All the ports to the primary and secondary air supply chambers 45 and 50 save the air inlets 41 and 47 may, of course, be plug closed as shown in dot-dash lines including those to which the air pressure gauges 55 and 56 are connected. Also, the valve may only be provided with a single primary air inlet 41 and a secondary air inlet 47.

The valve, according to this invention, is fail safe in that the access between the valve and the primary or main air supply is never inhibited or blocked.

It can be seen that axial movement of the piston 18 from its lowest position as shown to its highest position where the step 23 of the axial extension 21 abuts the radially-inward stepping 27 of the main body 10 still leaves open the main air supply inlet 41, the main air inlet chamber 45 and consequently the air supply bores 46 to the air outlet chamber 38.

In normal use, primary or main air is supplied to the main air supply chamber 45 the air inlet 41. This air supply acts on working surfaces 21A and 23A of the piston 18 to force it downwardly against the O-ring seal 26 thus to shut off the axial bore 24. Air from the main air supply chamber 45 flows along the bores 46 into the air outlet chamber 38 and from there out of the axially-bored spigot 40 to a breathing mask (not shown).

Should the main air supply fail, be arrested or fall below a predetermined limit, i.e. a pressure value less than that needed to restrain upward axial movement of the piston 18, the piston 18 moves axially upwards away from the O-ring seal 26 resulting from secondary air pressure. As a result secondary air flows up the axial bore 24 and raises the non-return valve 31 against the restraining pressure of the spring 35 (secondary air pressure and spring pressure being predetermined to ensure such action). Secondary air then flows through the holes 34 into the cap 36 and out through the holes 39 into the air outlet chamber 38 and from thence out through the axially-bored spigot 40 to the breathing mask (not shown). There is thus instantaneous or substantially instantaneous switch from primary air supply to secondary air supply.

Any downward flow of secondary air down the bores 46 into the primary air supply is blocked by the one-way valve 44.

Secondary air also flows along the passage 51 and out of the port 52 to actuate the whistle 53 thus indicating to the user of the breathing apapratus that he or she is operating on the secondary air supply which usually is of limited quantity compared with the primary air supply.

While the valve has, in the above example, been described in use with a breathing apapratus it will be manifest that it can readily be employed, inter alia, in any of the aforementioned applications 1 to 8.

Referring now to FIGS. 2 to 4 of the drawings, the valve comprises a cylinder 100 with inlet and outlet ports 102 and 103 at one end for primary air the flow of which is illustrated by the solid black line 104. At the other end of the cylinder 100 is an inlet port 105 for secondary air the flow of which is illsutrated by the hatched line 106 A piston 107 with an O-ring 108 sweeps the cylinder region between the inelt ports 102 and 105. The piston 107 is integral with cylindrical axial extensions 109, 110 to opposite sides thereof. The extensions 109, 110 are of different diameter such that the annular working surface 107A at the upper side of the piston 107 is of substantially larger area than the corresponding surface 107B at the opposite side. The free end of the extension 109 is equipped with an O-ring 111 and is slidably received in a cylindrical outlet 112 for secondary air. An axial bore 113 penetrtes the piston 107 and its extensions 109 and 110. The free end of the piston extension 110 is shaped to provide a lip 114 around the mouth of the bore 113 and in the illustrated normal position of use this lip 114 is in sealing engagement with PTFE seal 115 set into the adjacent end of the cylinder 100.

The secondary air outlet 112 is connected by a conduit 117 to the spring-loaded non-return valve 31 (see FIG. 4) comprising a seat 119 onto which is urged by a spring (not shown) a valve disc 32 with an inset sealing element 33 on its side adjacent the seat 119. The valve disc 32 has a ring of holes 34 around the sealing element 33 to permit proper flow of outlet air when the valve disc 32 is lifted off its seat 119. As is diamgrammatically illustrated in the drawing the conduit for the primary outlet air 104 combines with that for the secondary outlet air 106 downstream of the non-return valve 32 as in the manner of FIG. 1 (see 38 and 40).

The secondary air conduit 117 has a branch 122 upstream of the non-return valve 31. The branch 122 is connected to an air whistle 123 of conventional design but it will be appreciated that the whistle 123 may be substitued by any othe rfluid pressure activated signal generating means, acoustic or otherwise.

In operation, the cylinder 100 is directly connected to the primary and secondary air but because of the differential area of the working surfaces 107A, 107B the piston 107 is biased into the illustrated position in which the piston extension 110 bears against the PTFE seal 115 at the adjacent end of the cylinder 100 to close the axial bore 113. The primary air is thus delivered to the operative by way of the outlet port 103 and the path 104. If the primary air now fails or its pressure drops below a threshold value the pressure of the secondary air acting on the piston working surface 107B raises the piston out of the ilustrated position to clear the axial bore 113. The secondary air passes through the axial bore 113 and the outlet 112 to pressurize the coondiut 117 and the branch 122 thereby blowing the whistle 123 and opening the non-return valve 31. In this way, the secondary air is delivered to the operative so rapidly that his breathing is unaffected and were it not for the alarm signal given by the whistle 123 the switch from the primary to secondary air would be undectable. When primary air or the full pressure of the primary air is now restored the piston 107 is displaced to its starting position so cutting off the secondary air be closure of the bore 113 with consequent closure of the non-return valve 31.

In this embodiment also it is to be noted that the valve is fail safe in that with the piston 107 in its uppermost position there is no blockage between the primary air inlet 102 and outlet 103.

Referring now to FIG. 5 of the drawings, the valve comprises a cylinder 200 with primary and secondary inlets designated 201 and 202 respectively.

The cylinder 200 has a primary air outlet 203 and a secondary air outlet 204 both of which merge into a common air outlet pipe 205.

The cylinder 200 defines chamber 206 with which the air inlets 201 and 202 and air outlets 203 and 204 commumicate as shown, and a piston 207 is slidably housed in the chamber 206.

The piston 207 in longitudinal cross-section is of inverted T configuration so that the piston 207 has opposed working surface 207A, 207B of differential area.

The stem 208 of the inverted T configuration piston is formed with an axial bore 209 open laterally as indicated at 210 to the chamber 206.

The outlet passage 204 communicates ith the chamber 206 a centrally closed spider arrangement 211 or similar mounting a central PTFE seal 212 so that when the stem 208 of the piston 207 abuts the latter communication between the bore 209 and the outlet passage 204 is prevented.

O-ring seals 213 and 214 or similar are respectively disposed between the stem 208 and the casing 200 and the main body of the piston 207 and the casing 200 to seal communication between the chamber 206 and the outlet passage 204 save through the axial bore 209 and to divide the chamber 206 into a lower primary fluid compartment and an upper secondary fluid compartment.

A projection 215 is provided at the end wall of the cylinder 200 in the lower primary fluid compartment to ensure that the piston 207 never seals the primary fluid supply inlet 201 and outlet 203 thus rendering the valve fail safe.

The casing 200 downstream of the fluid inlets 201 and 202 has a branch outlet 216 in communication with the secondary outlet 204 and to which the air-operated whistle (not shown) is connected.

The upper secondary fluid compartment may incorporate a mechanical spring (not shown) to assist movement of the piston 207 upon failure, closure or reduction in pressure of the primary fluid supply.

The spring-loaded non-return valve 31 is again provided and functions as describe with reference to FIG.

1. It also serves to ensure non-operation of the whistle by the primary air supply.

It will be appreciated that although the above designs utilises single sources of primary and secondary air more than one of such sources may be provide as an additional safety precaution. Furthermore, the valve of the invention may be used in other systems in which an assured supply of secondary fluid (whether air of other gas or liquid) is required. If the secondary supply is as reliable as the primary supply or it the supplies are being otherwise monitored or no monitoring is required, the whistle or other signal generating means may be omitted.

The secondary fluid supply, if the valve of the kind described is not to be used for life support purposes, may simply be delivered, when called for, through the brance outlet, or outlets if more than one is provided, to operate, actuate or otherwise initiate a function.

Non-return valves may be provided, inter alia, at the primary or secondary fluid inlets for example.

All fluid passageways are preferably internal of the cylinder.

I claim:

1. A valve for controlling the flow of fluid from at least two alternative supplies in such a manner that reduction or cessation of one supple automatically causes the valve to switch to an alternative supple, the valve comprising a cylinder having a piston slidable therein in a region between a first fluid inlet and a seond fluid inlte, the piston having working surfaces of differential area such that equal pressure on both sides of the piston biases the piston to one end of the cylinder, a fluid outlet from the valve, a first fluid flow path from the first fluid inlet to the fluid outlet, a second fluid flow path from the seond fluid inlet to the fluid outlet and iincluding an axial outlet bore, the seond fluid flow path being closable by the piston and being opened upon axial movement of the piston towards the first flluid inlet caused when the supply of fluid from the first fluid inlet fails, is arrested or falls below a predetermined limit, the valve beting characterised in that first fluid low path is permanently open thus rendering the valve fail safe, and in that the axial outlet bore of the second fluid flow path is formed through the piston and is closable by a seal in the cylinder against which an end of the piston is adapted to abut.

2. A valve as claimed in claim 1, in which the piston has axial projections to both sides thereof to provide the working surfaces of different areas.

3. A vlave as claimed in claim 2, in which the axial bore also extends through teh axial extensions, one of which is adapted to abut the seal.

4. A valve as claimed in claim 1, in which the piston is of inverted T configuration in longitudinal section, the stem of the T having the axial outlet bore forming part of the second fluid flow path.

5. A valve as claimed in claim 4 in which the axial bore opens laterally of the stem and parallel with the crossbar of the T to the second fluid inlet with the end of the stem remote from the crossbar being adapted to abut the seal.

6. A valve as claimed in any one of claim 1 to 3 comprising a main body constituting the cylinder, whereof the chamber accommodates the axially-movable piston, and which has connected to each end a cap.

7. A valve as claimed in claim 6 in which the first fluid flow path comprises a main fluid inlet chamber at one side of the piston communicating via passage means parallel with the cylinder chamber with a fluid outlet chamber defined by the main body and one of the end caps.

8. a valve as claimed in claim 7 in which said one end cap is axially bored to permit fluid egress from the fluid outlet chamber.

9. A valve as claimed in claim 7 in which the passage means is a plurality of angularly-spaced bores in the main body.

10. a valve as claimed in claim 7 in which the main fluid inlet chamber is provcided with more than one fluid inlet and one or more fluid outlets other than the passage means.

11. A valve as claimed in claim 10 in which a pressure gauge is connected to a fluid outlet from the main fluid inlet chamber.

12. A valve as claime in claim 10 in which any fluid inlets additional to one and any fluid outlets are plugged closed when not in use.

13. A valve as claime in claim 7 in which the second fluid flow path comprises a secondary fluid inlet chamber in the other end cap at the other side of the piston communicating, upon the movement of the piston away from the end seal, via the piston axial outlet bore with the fluid outlet chamber.

14. A valve as claime d in claim 13 in which a one-way valve is interposed between the axial outlet bore and the fluid outlet chamber.

15. A valve as claimed in claim 14 in which the one-way valve is spring-loaded against a valve seat and comprises a valve disc with a central inset sealing element adapted to abut and close the valve seal, the valve disc being formed with a ring of fluid passage holes surrounding the sealing element.

16. A valve as claimed in claim 15 comprising a loading spring between the valve disc and a retaining cap secured on the main body, the retaining cap being apertured to permit fluid flow to the fluid outlet chamber.

17. A valve as claimed in claim 13 in which the secondary fluid inlet chamber is provided with more than one fluid inlet and one or more fluid outlets than the piston axial outlet bore.

18. A valve as claimed in claim 17 in which a pressure gauge is connected to a fluid outlet from the secondary fluid inlet chamber.

19. A valve as claimed in claim 17 in which any fluid inlets additional to one and any fluid outlets are plugged closed when not in use.

20. A valve as claimed in claim 6 comprising one or more branch passages from the cylinder chamber leading to one or more fluid outlets.

21. A valve as claimed in claim 20, comprising a fluid-operated acoustic or other signalling device connected to a fluid outlet of a branch passage to signal that the valve is operating on the secondary fluid supply.

22. A valve as claimed in claim 20 in which the fluid outlets are plugged closed when not in use.

23. A valve as claimed in claims 2 or 3 comprising O-ring seal means between the piston and the axial extensions and the cylinder.

* * * * *